United States Patent [19]
Hitomi et al.

[11] Patent Number: 5,201,907
[45] Date of Patent: Apr. 13, 1993

[54] INTERNAL COMBUSTION ENGINE

[75] Inventors: Mitsuo Hitomi; Shunji Masuda; Toshihiko Hattori; Kenji Kashiyama; Junsou Sasaki, all of Hiroshima, Japan

[73] Assignee: Mazda Motor Corporation, Hiroshima, Japan

[21] Appl. No.: 904,475

[22] Filed: Jun. 25, 1992

[30] Foreign Application Priority Data

Jun. 28, 1991 [JP] Japan .................. 3-183654
Jul. 30, 1991 [JP] Japan .................. 3-212610

[51] Int. Cl.$^5$ ............................ F02B 19/10
[52] U.S. Cl. ................ 123/48 D; 123/540; 123/316
[58] Field of Search ............... 123/260, 48 D; 78 D, 123/540, 292, 316, 193.2, 274, 311

[56] References Cited

U.S. PATENT DOCUMENTS

| | | | |
|---|---|---|---|
| 3,919,984 | 11/1975 | Yagi et al. | 123/260 |
| 4,223,645 | 9/1980 | Nohira et al. | 123/292 |
| 4,232,641 | 11/1980 | Curtil | 123/316 |
| 4,817,388 | 4/1989 | Bland | 123/292 |
| 4,854,281 | 8/1989 | Hareyama et al. | 123/292 |
| 5,009,199 | 4/1991 | MacFarlane | 123/316 |
| 5,025,769 | 6/1991 | Plohberger et al. | 123/316 |
| 5,038,725 | 8/1991 | Okazaki et al. | 123/540 |
| 5,069,178 | 12/1991 | Kawamura | 123/292 |
| 5,101,776 | 4/1992 | Ma | 123/48 D |

FOREIGN PATENT DOCUMENTS 54-98408 8/1979 Japan .
54-116512 9/1979 Japan .
2-36772 8/1990 Japan .

*Primary Examiner*—David A. Okonsky
*Attorney, Agent, or Firm*—Fish & Richardson

[57] ABSTRACT

The engine is provided with an auxiliary chamber having an auxiliary chamber port with an opening communicated with the combustion chamber. The auxiliary chamber port is arranged to be opened or closed with an auxiliary chamber valve. The timing of closing the auxiliary chamber valve is in between a final stage of compression stroke in which the temperature within the cylinder becomes higher and an initial stage of explosion stroke. On the other hand, the timing of opening the auxiliary chamber valve is in a middle stage of the compression stroke, thereby allowing the mixed fuel cooled in the auxiliary chamber to be replaced with a portion of the mixed fuel in the combustion chamber, thereby lowering the temperature within the cylinder.

28 Claims, 5 Drawing Sheets

INTERNAL COMBUSTION ENGINE

BACKGROUND OF THE INVENTION

1. Field of the Invention

The present invention relates to an internal combustion engine and, more particularly, to improvements of an internal combustion engine in thermal efficiency.

2. Description of the Related Art

Recently, there is the increasing tendency that internal combustion engines are provided with a fuel injection valve as a fuel feed means and that the fuel injection valve is controlled by a control unit of electronic type, for example, as disclosed in Japanese Patent Publication (kokoku) No. 2-36,772. The internal combustion engine of this kind offers the advantage that an air-fuel ratio of a mixed fuel can be controlled with high freedom. The aforesaid publication discloses an internal combustion engine which is adapted so as to be operated in an air-fuel ratio leaner than the stoichiometric air-fuel ratio, that is, a so-called lean-burn engine.

It is to be noted, however, that the internal combustion engine can provide higher heat frequency in an air-fuel ratio of a mixed fuel leaner than the stoichiometric air-fuel ratio.

The internal combustion engine is so arranged that mechanical work can be conducted by taking advantage of a rise in pressure of a cylinder, caused by the combustion of a fuel fed to a combustion chamber of the engine. Hence, a higher rise in the pressure within the cylinder can provide more efficient work. Given the isometric combustion, a ratio in the rise of the pressure of the cylinder can be represented by the following equation (1):

$$\Delta P = \frac{\epsilon \times R}{V} \times \frac{Q}{C_v} \qquad (1)$$

where P is the ratio in the rise of pressure in the cylinder;
$\epsilon$ is the compression ratio;
R is a gas coefficient;
Q is the heat capacity;
V is the volume of the combustion chamber; and
$C_v$ is the isometric specific heat or the constant volume specific heat.

The variation of the temperature relative to the ratio in the rise of the pressure in the cylinder can be given by differentiating the equation (1) above and it can be represented by the equation (2) as follows:

$$\frac{d(\Delta P)}{dT} = -\frac{\epsilon \times R}{V} \times \frac{Q}{C_v^2} \times \frac{dC_v}{dT}$$

It is known that the isometric specific heat $C_v$ is made larger as the temperature becomes higher. Hence, the expression, $dC_v/dT$, of the right side of the equation (2) is smaller than zero (0), then the right side of the equation (2) gives a negative value so that the left-hand expression, $d(\Delta T)/dT$, of the left side becomes negative, too.

In other words, that the left side, $d(\Delta T)/dT$, is a negative value means that the higher temperature in the cylinder, T, makes a rise ratio of the pressure in the cylinder, $\Delta P$, smaller, thereby leading to higher efficient work.

On the other hand, it can be noted that there is the relationship between the air-fuel ratio of a mixed fuel and the ratio of the rise in the temperature associated with the combustion of the fuel, i.e. the temperature in the cylinder, T, such that, when the air-fuel ratio becomes leaner than the stoichiometric air-fuel fuel ratio, i.e. when the internal combustion engine is a so-called lean-burn engine, a portion of the heat capacity generated by combustion is absorbed in a surplus amount of the air, thereby leading to lowering the temperature T in the cylinder. Of course, the greater the extent to which the air-fuel ratio becomes leaner, the more the surplus amount of the air, thereby lowering the temperature T within the cylinder.

As is apparent from the foregoing, the lean-burn engine—when the air-fuel ratio is leaner than the stoichiometric air-fuel ratio—lowers the temperature T within the cylinder, thereby making the rise ratio $\Delta P$ of the pressure within the cylinder larger, thereby conducing better work. Further, as the air-fuel ratio becomes leaner, the better work can be done and the heat efficiency is further improved.

Actually, the temperature T within the cylinder is so lowered that the transmission of heat to the wall surface of the combustion chamber is reduced, thereby reducing the loss in cooling. Hence, the heat efficiency can be improved from the point of view of the loss in cooling by making the air-fuel ratio leaner.

For the lean-burn engine, the air-fuel ratio has heretofore been restricted in such a manner that the air-fuel ratio of a mixed fuel reaches a predetermined lean air-fuel ratio such as, for example A/F=18, in a low load region and a middle load region (these regions being referred to hereinafter as generally "low load region", in contrast to the high load region as will be described hereinafter). In the high load region, it is common to ensure output in accordance with the load by making the mixture ratio of the fuel gradually larger, that is, by making the air-fuel ratio gradually richer. The same thing can be applied to an engine with a supercharger.

The reasons for making the air-fuel ratio for the lean-burn engine richer in accordance with the load in the high load region are: to gain the output in accordance with the load only by increasing the amount of the fuel because no sufficient extent of the output can be provided solely in the lean-burn state of the engine due to the limit of the ability of the intake system; and to lower the temperature within the cylinder by making the air-fuel ratio richer.

It is to be noted, however, that making the air-fuel ratio rich in the high load region does lead to reducing the heat efficiency in this region. If the heat efficiency would be lowered in the high load region regardless of the fact that the heat efficiency has been made higher by making the air-fuel ratio leaner in the low load region, improvements in the overall heat efficiency of the engine is caused be lowered.

On the other hand, Japanese Patent Laid-open (kokai) Publication Nos. 54-116,512 and 54-980,408 disclose an engine which has an auxiliary chamber having an opening through which it is communicated with a combustion chamber, in addition to a combustion chamber, and an auxiliary chamber valve for opening and closing the opening through the auxiliary chamber. This engine is arranged to generate a strong swirl within the combustion chamber by opening the auxiliary chamber valve at the timing of closing an intake valve and taking advantage of the mixed fuel in the auxiliary chamber, i.e. the pressure differential between the auxiliary chamber and the combustion chamber, particularly in the low load region. It is to be noted, however, that this engine is not arranged so as to reduce the temperature within the cylinder.

SUMMARY OF THE INVENTION

The object of the present invention is to provide an internal combustion engine so adapted as to improve heat efficiency by reducing the temperature within the cylinder.

In order to achieve the aforesaid object, the present invention consists of an internal combustion engine, characterized by an auxiliary chamber having an opening communicated to a combustion chamber of the internal combustion engine; and an auxiliary chamber valve for opening or closing the opening of said auxiliary chamber to the combustion chamber;

wherein a timing of opening or closing said auxiliary chamber valve is set in such a manner that said auxiliary chamber valve is opened in a middle stage of a compression stroke and closed in a final stage of the compression stroke or in an initial stage of explosion stroke.

With the arrangement as described hereinabove, a mixed fuel heated in association with compression is filled into the auxiliary chamber and is cooled down in the auxiliary chamber. The mixed fuel cooled within the auxiliary chamber is then replenished or replaced with a portion of the mixed fuel present in the combustion chamber in the coming compression stroke, thereby leading to cooling the mixed fuel in the combustion chamber and lowering the temperature within the cylinder. It can be noted that, as the temperature of the mixed fuel to be introduced into the auxiliary chamber becomes higher, the cooling effect created by the auxiliary chamber is made higher, thereby lowering the temperature within the cylinder to a large extent and improving the heat efficiency. The lowering of the temperature within the cylinder offers the advantage in terms of avoiding knocking and permits improvements in heat efficiency by making the compression ratio higher.

Although described hereinabove, the fact that better work can be done as the temperature within the cylinder is made higher will be described again from the different point of view.

The heat capacity Q of a fuel can be represented by the following formula (3):

$$Q = Cv \times G \times \Delta T$$

wherein Cv is the isometric specific heat;
G is the mass of the mixed fuel to be charged into the combustion chamber;
$\Delta T$ is the ratio of elevation of the temperature in association of combustion (or the ratio of rise of the temperature within the cylinder).

The formula (3) can be modified to give the formula (4):

$$\Delta T = \frac{Q}{Cv \times G}$$

As is understood from the formula (4), when the heat capacity Q and the mass of the mixed fuel, G, are constant, the ratio of elevation of the temperature, $\Delta T$, is made larger as the isometric specific heat Cv becomes smaller.

It can be noted herein that, as described hereinabove, the isometric specific heat Cv becomes larger as the temperature T is made higher, as shown in FIG. 1. In other words, as the temperature T within the cylinder is lower, the isometric specific heat becomes smaller. Hence, as the temperature T within the cylinder is lower, the ratio of elevation, $\Delta T$, of the temperature within the cylinder in association with combustion becomes larger.

It can further be noted that, as the ratio of elevation of the temperature within the cylinder, $\Delta T$, is larger, the pressure within the cylinder is elevated in a larger ratio, i.e. $\Delta P$ becomes larger. Hence, as the temperature T within the cylinder is lower, the ratio of elevation of the pressure within the cylinder, $\Delta T$, becomes larger.

In other words, if the same amount of the fuel is charged and the same heat capacity is given, the ratio of elevation of the pressure within the cylinder, $\Delta P$, becomes larger as the temperature T within the cylinder is lower, thereby conducting better work, i.e. providing higher heat efficiency.

In order to take advantage of the elevation of the temperature to the maximum extent by compressing the mixed fuel in the combustion chamber, the timing of closing the auxiliary chamber valve is arranged to comply with the compression top dead center. On the other hand, in order to take advantage of the elevation of the pressure by combustion to the maximum extent, it is preferred that the closing timing of the auxiliary chamber valve is delayed as late as possible (a crank angle at which the maximum pressure by combustion being approximately 30 deg after top dead center of compression (ATDC)).

The actual state of combustion varies to a great extent with cycles as shown in FIG. 2 as an indicator diagram. If the auxiliary chamber valve is being opened until the time when the pressure within the cylinder varies to a great extent, the pressure, density, and temperature of the mixed fuel enclosed in the auxiliary chamber may also vary with cycles and this suffers from the disadvantages.

In the case of specifications and running conditions of an internal combustion engine as shown in FIG. 2, the timing at which the pressure within the combustion chamber varies is approximately 20 deg after the timing of ignition. If the auxiliary chamber valve is closed immediately before the variation in the elevation of the pressures in association with combustion occurs, the effect of cooling the mixed fuel can be enhanced while suppressing the influence of the variation in combustion. In FIG. 2, the specifications and running conditions of the engine are as follows: 1,600 cc, 4-cylinder; 5,000 rpm; WOT; A/F=13; ignition timing=20 deg BTDC; $\epsilon$=10. On the other hand, if the variation in the pressure by the combustion is arranged so as to exert no adverse influence upon the mixed fuel, the auxiliary chamber valve is closed nearly at the timing of ignition, i.e. in the final stage of the compression stroke.

More specifically, the timing of opening the auxiliary chamber valve may be determined depending upon the relationship with the timing of closing the auxiliary chamber valve. If the auxiliary chamber valve is opened, the mixed fuel in the auxiliary chamber valve cannot be replaced with the mixed fuel in the combustion chamber immediately thereafter, and the substitution allows for some period of time. If the auxiliary chamber valve would be opened at a too early timing, the compression stroke can be implemented under the total volume of the volume of the combustion chamber and the volume of the auxiliary chamber, thereby increasing the loss in compression.

Hence, the auxiliary chamber valve may be opened as late as possible after entering into the compression stroke, i.e. after the intake valve was closed, and at the timing that can ensure the period of time required for replacing the mixed fuel in the auxiliary chamber with that in the combustion chamber. In other words, the timing of opening the auxiliary chamber valve is in a middle stage of the compression stroke. It is to be noted as a matter of course that the timing of opening the auxiliary chamber valve may finally be determined on the basis of experiments.

Other objects, features and advantages of the present invention will become apparent in the course of the description of the preferred embodiments, with reference to the accompanying drawings.

DESCRIPTION OF THE PREFERRED EMBODIMENTS

The present invention will be described more in detail by way of examples with reference to the accompanying drawings.

Figure 1:
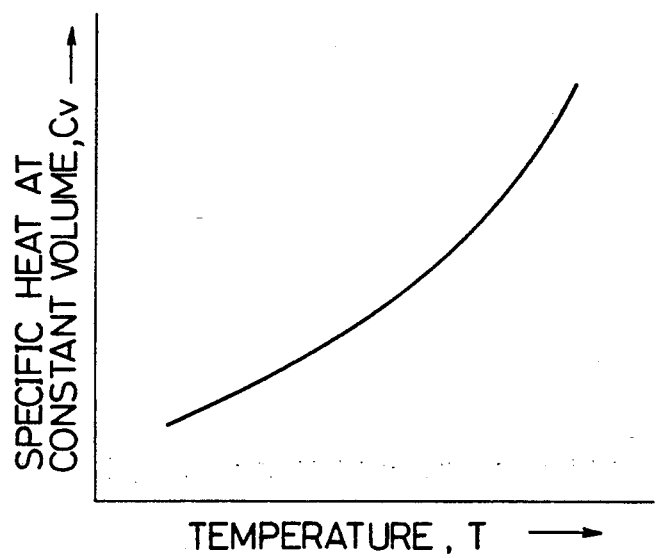
FIG. 1 is a graph showing the relationship between the isometric specific heat and the temperature of the mixed fuel.
Figure 2:
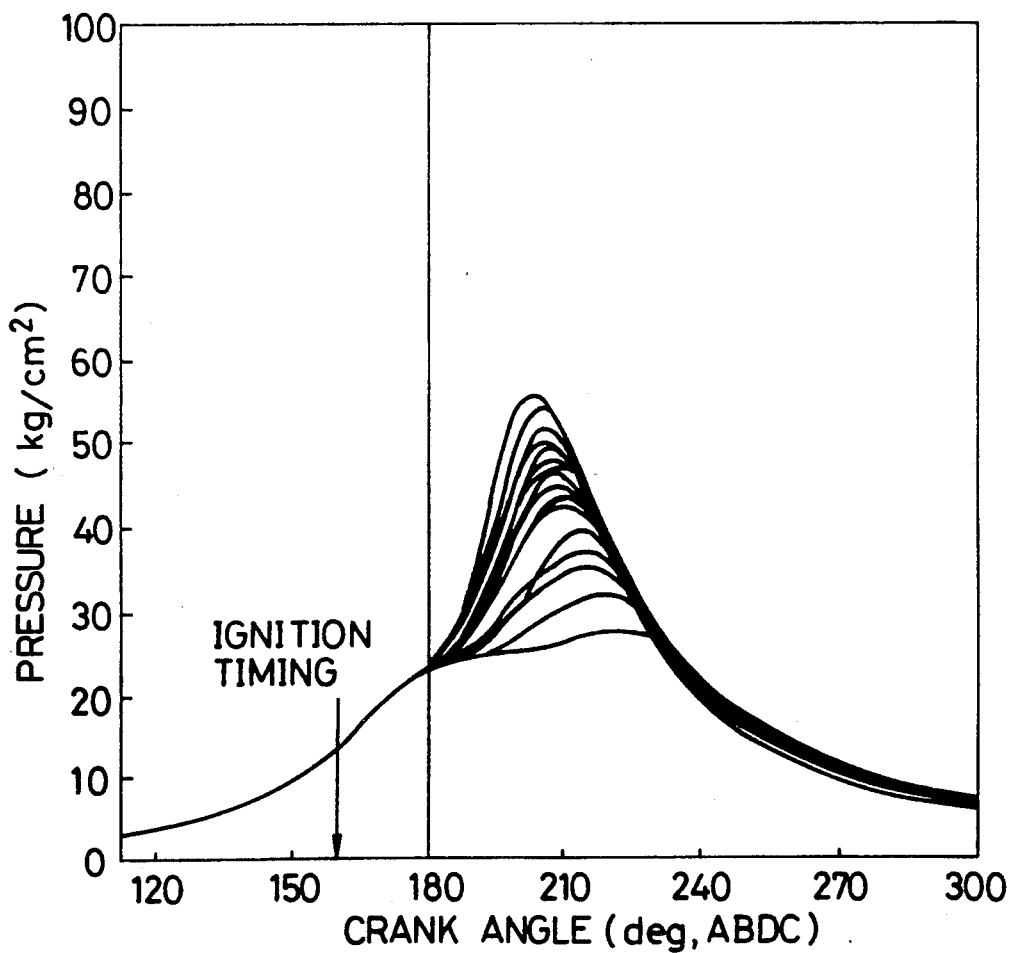
FIG. 2 is a representative indicator diagram for an internal combustion engine.
Figure 3:
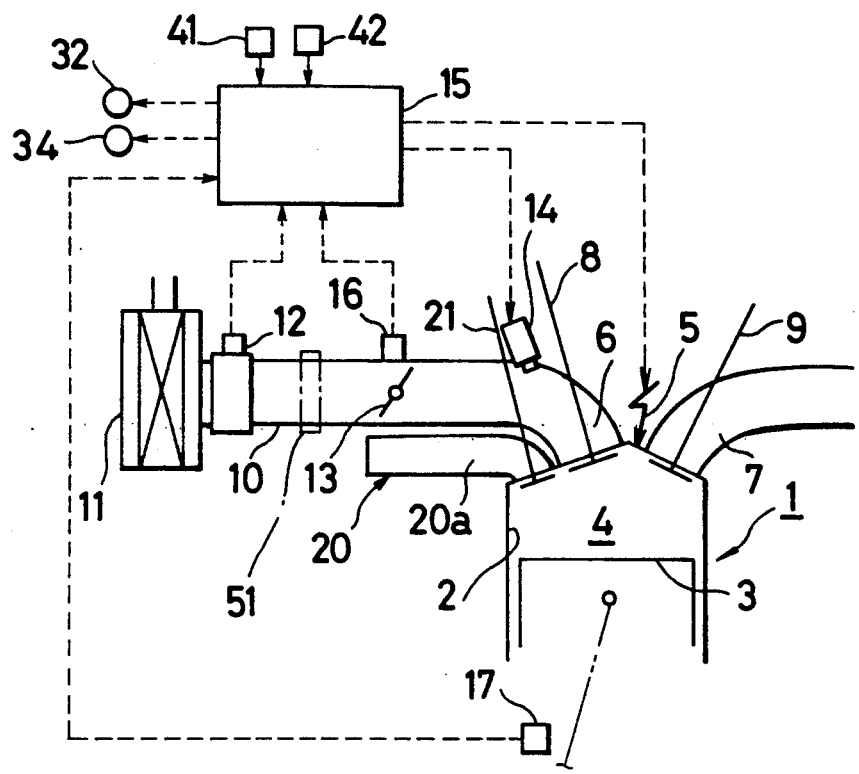
FIG. 3 is a block diagram showing an internal combustion engine according to the present invention.

As shown in FIG. 3, reference numeral 1 denotes an internal combustion engine, and the engine 1 has a combustion chamber 4 defined by and delimited by a piston 3 which is inserted slidably in a cylinder bore 2, and a spark plug 5 is arranged facing the combustion chamber 4.

The combustion chamber 4 is provided with openings for an intake port 6 and an exhaust port 7. The intake port 6 has an intake valve 8 and the exhaust port 7 has an exhaust valve 9; the intake valve 8 and the exhaust valve 9 are arranged to be opened or closed in synchronization with an engine output axle (as indicated by reference numeral 31 in FIG. 8, although not shown in FIG. 3) at a predetermined timing.

An intake passage 10 communicated with the intake port 6 is provided with an air cleaner 11, an air flowmeter 12 for detecting an amount of intake air, and a throttle valve 13 in this sequential order from the upstream side to the downstream side. Further, a fuel injection valve 14 is disposed facing the intake port 6. The engine 1 having the structure as described hereinabove is known as a gasoline 4-cycle engine of an Otto-cycle type.

Figure 8:
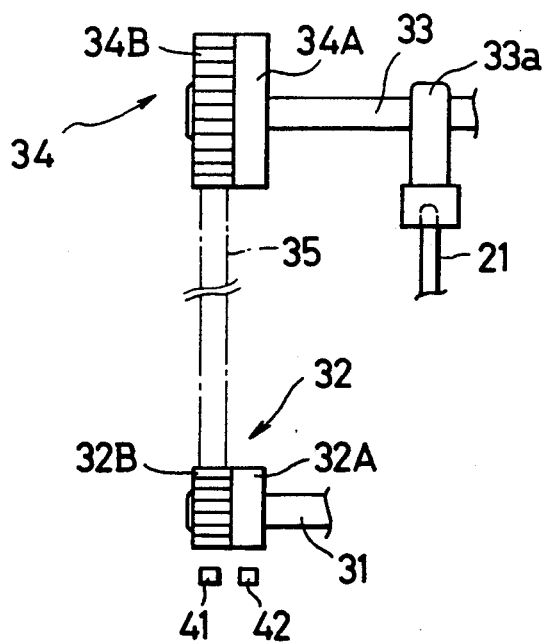
FIG. 8 is a block diagram showing an example of a drive mechanism for the auxiliary chamber valve.

The engine 1 is provided with an auxiliary chamber 20, as will be described hereinafter, which in turn has an auxiliary chamber port 20a having an opening to the combustion chamber 4, and the auxiliary chamber port 20a is arranged to be opened or closed by an auxiliary chamber valve 21 disposed to the auxiliary chamber 20. As shown in FIG. 8, the auxiliary chamber valve 21 is arranged to be driven by an engine output axle 31 through a cam shaft 33 for exclusive use with the output axle. To the output axle 33 is mounted a clutch 32 of electromagnetic type, and the clutch 32 has a drive member 32A fixed to the engine output axle 31 and a driven member 32B arranged to be coupled with or decoupled from the drive member 32A. On the other hand, the cam shaft 33 is provided with a variable valve timing mechanism 34 of hydraulic type, which is equipped with a first member 34A and a second member 34B; both of the fist and second members 34A and 34B are connected spirally to each other, while the first member 34A is fixed to the cam shaft 33. The second member 34B is rotatable integrally with the first member 34A and it is arranged so as for its position of a rotational phase to be variable with respect to the first member 34A.

Each of the driven member 32B and the second member 34B is composed of a teethed pulley, and a timing belt 35 is wound around and between the driven member 32B and the second member 34B. When the clutch 32 is coupled, this arrangement can transmit the rotation of the engine output axle 31 to the cam shaft 33 through the drive member 32A, the driven member 32B, the timing belt 35, the second member 34B, and the first member 34A, thereby allowing the auxiliary chamber valve 21 to be opened or closed at a predetermined timing by a cam 33a formed on the cam shaft 33. By changing the rotational phase of the fist and second members 34A and 34B of the variable valve timing mechanism 34, the timing of opening and closing the auxiliary chamber valve 21 can be changed. The auxiliary chamber valve 21 can be retained in its closed state with the aid of a return spring (not shown) by decoupling the clutch 32.

It is to be noted herein that the clutch 32 is not necessary when the auxiliary chamber valve 21 is always operated for opening or closing. Further, when the timing of closing and opening the auxiliary chamber valve 21 is not changed, the variable valve timing mechanism 34 is not necessary. As the variable valve timing mechanism 34, there may be employed a conventional one.

As shown in FIG. 3, reference numeral 15 denotes a control unit which may be composed of a microcomputer having CPU, ROM, RAM, CLOCK, and the like. Into the control unit 15, signals enter from sensors 12, 16, 17, 41, and 42. The sensor 12 is adapted to detect an amount of intake air; the sensor 16 to detect an angle of opening of the throttle valve 13, that is, a load (an engine load); the sensor 17 to detect the number of revolutions of the engine; the sensor 41 to sense the position of rotation of the driven member 32B of the clutch 32; and the sensor 42 to sense the position of rotation of the drive member 32A of the clutch 32. The control unit 15 generates control signals to the spark plug 5, the fuel injection valve 14, the clutch 32, and the variable valve timing mechanism 34.

As the Control of the spark plug 5 can be performed by the control unit 15 in conventional manner, a description on the control over the ignition timing will be omitted from the specification which follows. Likewise, a description on the control of the timing of the fuel injection will be omitted therefrom because the control of the fuel injection valve 14 can be conducted by the control unit 15 in substantially the same manner as conventional ones.

Figure 4:
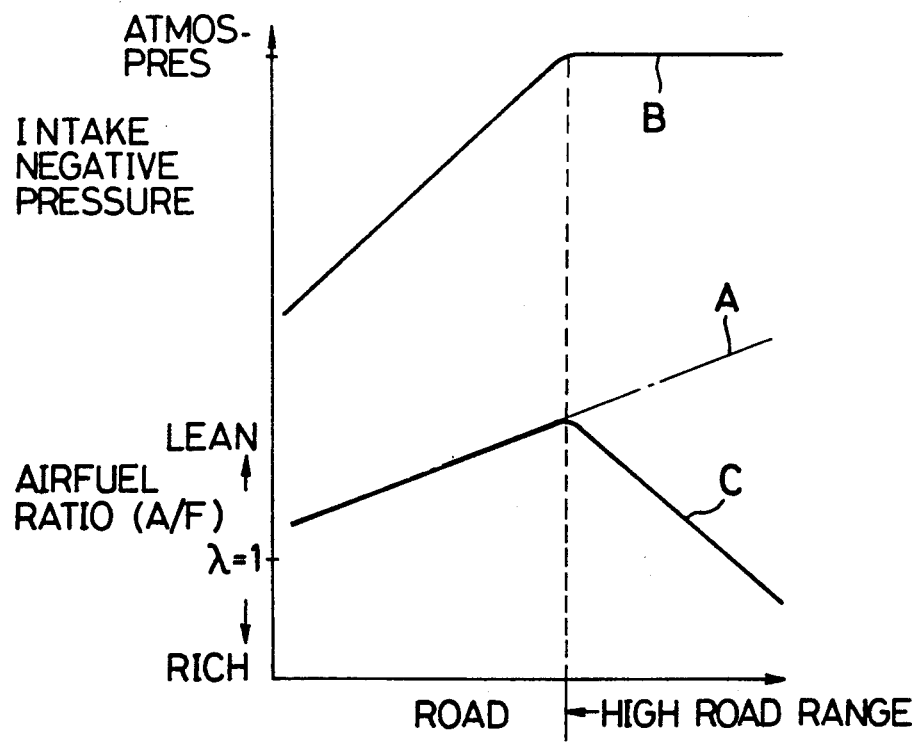
FIG. 4 is a graph showing the contents of control of the air-fuel ratio of the engine according to the example of this present invention.

FIG. 4 illustrates the control of the amount of the fuel to be injected, that is, the control of the air-fuel ratio of the mixed fuel. In FIG. 4, the line A indicates a lean potential of the engine 1. In other words, the amount of the fuel to be charged into the combustion chamber 4 is made larger as the load becomes higher, so that the lean limit of the air-fuel ratio becomes larger as the load is higher. This means that the higher load makes the leaner that air-ratio. Hence, the air-fuel ratio is controlled in such a manner that a target air-fuel ratio in which the air-fuel ratio is made leaner up to the lean potential A is set in a region (in a low load region) in which the amount of intake air can be increased.

On the other hand, the line B in FIG. 4 represents a region in which the amount of the intake air cannot be increased in accordance with the load, that is, a high load region in which the capacity of the intake system is surpassed. In such a high load region, output is arranged to be ensured in accordance with the load by increasing the amount of the fuel to be fed in accordance with the load. Accordingly, in this high load region, the target air-fuel ratio becomes richer depending upon the magnitude of the load. The relationship between the target air-fuel ratio and the load is indicated by the line C in FIG. 4.

In the high load region, the clutch 32 is coupled to allow the auxiliary chamber valve 21 to open the auxiliary chamber port 20a; in the low load region, the clutch 32 is decoupled to allow the auxiliary chamber valve 21 to retain the auxiliary chamber port 20a in its closed state.

Figure 5:
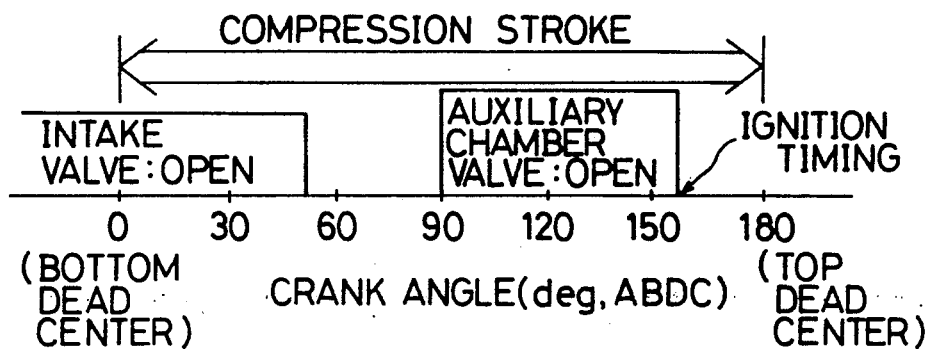
FIG. 5 is a diagram showing an example of the timing of opening and closing the auxiliary chamber valve.

FIG. 5 illustrates an example of the timing of opening and closing the auxiliary chamber valve 21 in the high load region. As shown in FIG. 5, the auxiliary chamber valve 21 is closed at the timing of ABCD 160 deg that is the same timing as the timing of ignition. The auxiliary chamber valve 21 is opened at approximately 70 deg before the closing timing. It can further be noted that the timing of closing the intake valve 8 is approximately 50 deg after the bottom dead center.

With the arrangement as described hereinabove, a portion of the mixed fuel within the combustion chamber 4 is enclosed by the auxiliary chamber valve 21 so arranged as to be opened and closed in the aforesaid compression stroke is cooled down in the auxiliary chamber 20, and the mixed fuel cooled in the auxiliary chamber 20 is replaced with a portion of the mixed fuel within the combustion chamber 4 in the compression stroke that follows. This allows the temperature of the mixed fuel within the combustion chamber 4, i.e. the temperature within the cylinder, in the high load region to be made lower than that of the mixed fuel within usual internal combustion engines having no auxiliary chamber. Hence, this arrangement can improve heat efficiency of the engine 1 in the high load region.

The lowering of the temperature within the cylinder in the high load region offers the advantage in taking measures against knocking and allows the compression ratio of the engine 1 to be made higher.

A description will now be made of the relationship between the lean burn and the high compression ratio. When the compression ratio of the engine 1 becomes higher, the volume of the cylinder becomes smaller at any crank angle than the engine with lower compression ratio. Hence, if the amount of the fuel to be charged would be the same, the density of molecules of the fuel within the combustion chamber 4 becomes higher in the smaller volume of the cylinder than in the larger volume of the cylinder, thereby improving ignitability and combustibility. If the air-fuel ratio would be the same, the heat efficiency can be improved merely by making the compression ratio higher and the air-fuel ratio can be made further leaner.

As is apparent from the foregoing description, the present invention can further improve the heat efficiency in the high load region because the temperature within the cylinder can be cooled to a lower level by the auxiliary chamber 20. In addition, the present invention can make the compression ratio of the engine higher, thereby improving heat efficiency further in the low load region. Furthermore, the present invention can make the air-fuel ratio leaner, thereby improving heat efficiency.

It is to be noted herein that the volume of the auxiliary chamber 20 may account for from approximately 30% to 50% of that of the combustion chamber at the top dead center and that the area of the auxiliary chamber valve 21 may account for from approximately 20% to 30% of the area of that of the intake valve 8. Specifically, for example, for a four-cylinder engine having a total displacement of 1,600 cc and a compression ratio of 10:1, the volume of the auxiliary chamber 20 may be calculated by: $1,600 \times \frac{1}{4} \times 1/10 \times (0.2-0.5)$, and set to be from approximately 80 cc to 200 cc. Further, the area of the auxiliary chamber valve 21 may be calculated by:

$$(27/2)^2 \times \pi \times (0.2-0.3),$$

and set to be in the range of from approximately 114 mm$^2$ to 172 mm$^2$, when the diameter of the intake valve 8 is set to 27 mm.

Figure 7:
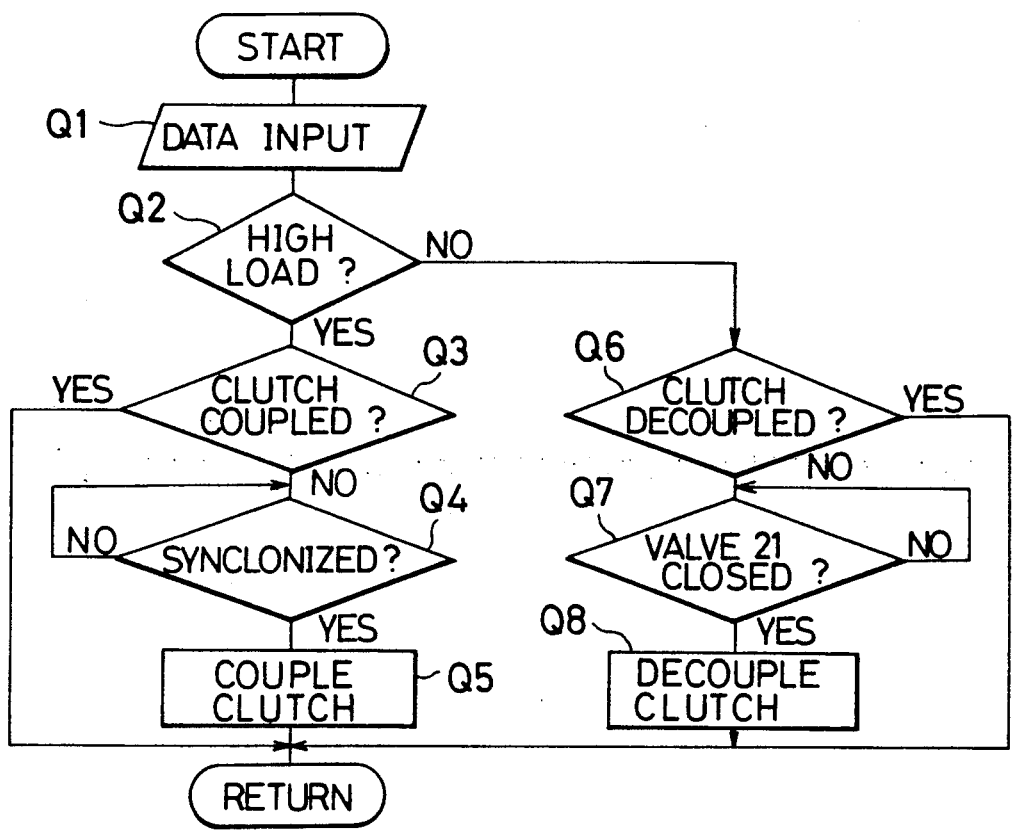
FIG. 7 is a flow chart showing an example of controlling a shift of the auxiliary chamber valve.

A description will now be made of an example of the control of shifting the operational states of the auxiliary chamber valve 21 in accordance with the engine load with reference to FIG. 7.

First, data is entered at step Q1 and it is decided at step Q2 to determine if it is at the time of high load that the auxiliary chamber valve 21 should be operated to open or close. When it is decided at step Q2 that it is at the time of high load, then it is further decided at step Q3 to determine if the clutch 32 is coupled or decoupled. Then, when the result of decision at step Q3 indicates that the clutch 32 is coupled, the program flow returns as it is because it has already been shifted to the state in which the auxiliary chamber valve 21 is ready to be operated to open or close.

On the other hand, at step Q3, it is decided that the clutch 32 is not coupled, followed by proceeding to step Q4 at which it is decided to determine, as a result of comparison between the outputs of the sensors 41 and 42, if the position of rotation of the engine output axle 31 has been synchronized with the position of rotation of the cam shaft 33 at a predetermined timing at which the auxiliary chamber valve 21 can be opened or closed in the manner as shown in FIG. 5. If the result of decision at step Q4 indicates that the position of rotation of the engine output axle 31 does not yet reach the position having a predetermined synchronizing relationship with the position of rotation of the cam shaft 33, it is waited until it reaches the synchronizing timing and, when it reached the predetermined timing, the clutch 32 is coupled at step Q5 to start operating to open or close the auxiliary chamber valve 21.

When it is decided at step Q2 that the load is not high, then the program flow goes to step Q6 at which it is decided to determine if the clutch 32 is decoupled. If it is decided at step Q6 that the clutch 32 is decoupled, then the program flow returns as it is because the auxiliary chamber valve 21 has already been held in its closed state.

On the other hand, when the result of decision at step Q6 indicates that it is not decoupled, then the program flow goes to step Q7 at which it is decided to determine on the basis of the output from the sensor 41 or 42 if the auxiliary chamber valve 21 is closed. When it is decided at step Q7 that the auxiliary chamber valve 21 is not yet closed, it is awaited until the result of decision at step Q7 indicates that the auxiliary chamber valve 21 is closed. When it is decided at step Q7 that the auxiliary chamber valve 21 is closed, then the program flow goes to step Q8 where the clutch 32 is decoupled, followed by the return of the flow. It can be noted herein that, although the auxiliary chamber valve 21 can be returned to its closed state by means of a return spring (not shown), the processing at step Q7 makes the closing of the auxiliary chamber valve 21 certain.

A description will now be made of examples of the configuration of the auxiliary chamber 20 with reference to FIGS. 9 and 10.

Figure 9:
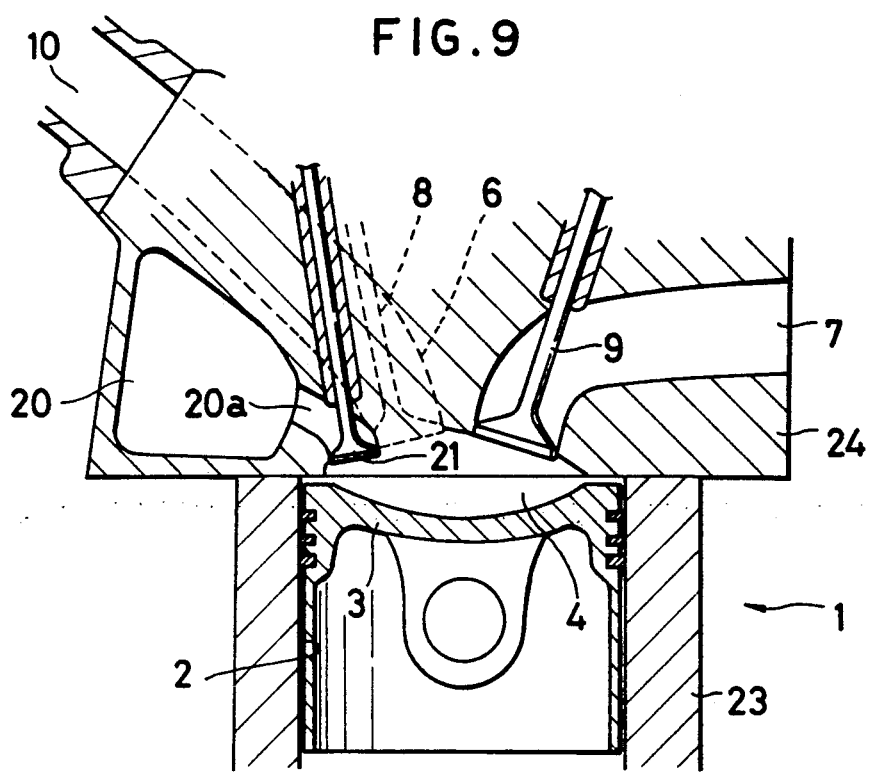
FIG. 9 is a sectional view showing an example of the auxiliary chamber valve.

In FIG. 9, reference numeral 23 stands for a cylinder block, and reference numeral 24 for a cylinder head. The auxiliary chamber 20 is arranged within the cylinder head 24 and communicated with the combustion chamber 4 through a comparatively short auxiliary chamber port 20a having an opening to the combustion chamber 4. By setting the direction in which the auxiliary chamber port 20a is directed to the combustion chamber 4, the mixed fuel to be fed to the combustion chamber 4 from the auxiliary chamber 20 through the auxiliary chamber port 20a is caused to swirl laterally or tumble vertically.

Figure 10:
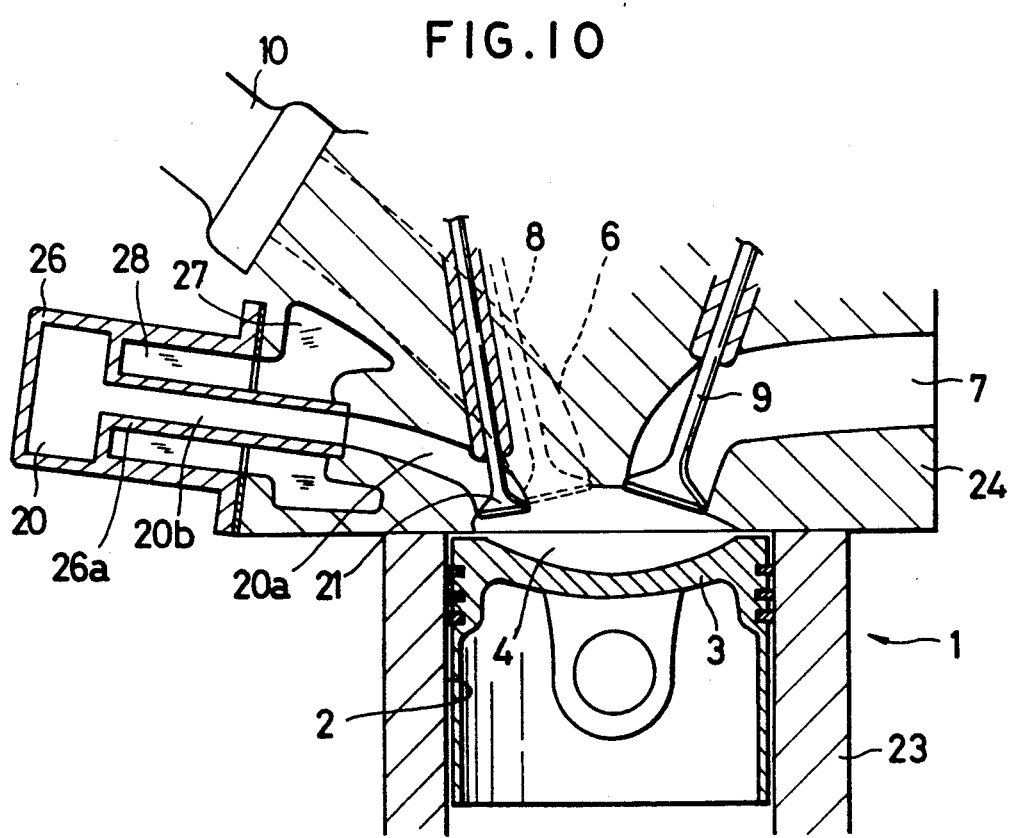
FIG. 10 is a sectional view showing another example of the auxiliary chamber valve.

Further, as shown in FIG. 10, the auxiliary chamber 20 is formed in an outside casing 26 bolted to the side surface of the cylinder head 24. The outside casing 26 is provided with a longitudinally long and sectionally small-sized connecting tube 26a, and a connecting passage 20b formed in the connecting tube 26a is then associated and communicated with an auxiliary chamber port 20a formed in the cylinder head 24. The auxiliary chamber port 20a is then communicated with the auxiliary chamber 20. The connecting tube 26a is provided at its outer periphery with coolant passages 27, 28. The coolant passage 27 is formed in the cylinder head 24 and the coolant passage 28 is formed in the outside casing 26 so as to be communicated with the coolant passage 27. In the example as shown in FIG. 10, the mixed fuel can be cooled more efficiently and eventually the temperature within the cylinder can be lowered, by taking advantage of the coolant passages 27, 28. Further, a swirl or tumble of intake air can be caused effectively by taking advantage of the relatively long connecting passage 26b.

Although the foregoing description is made on the embodiments according to the present invention, it should be understood that the present invention is not restricted to those embodiments as described hereinabove and it contains within its scope various modifications and variations, for example, which follows.

Figure 6:
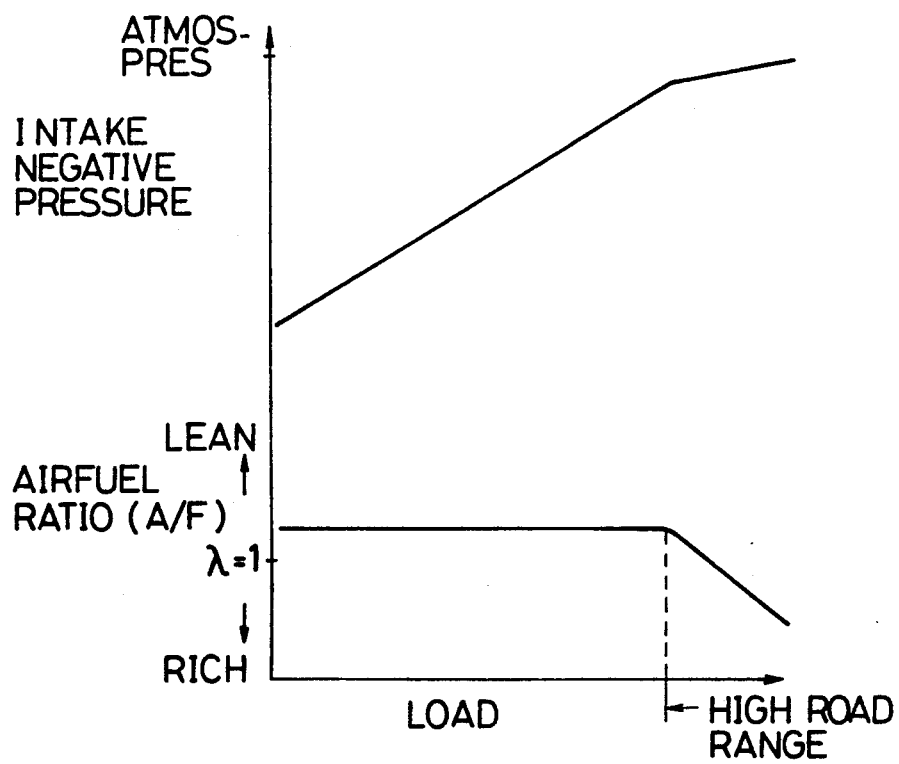
FIG. 6 is a graph showing a conventional example of the contents of control of the air-fuel ratio of the engine.

1. In the conventional control of the air-fuel ratio—as shown in FIG. 6, where the target air-fuel ratio is set to a predetermined lean air-fuel ratio in the low load region and the air-fuel ratio is arranged so as to become richer in accordance with the load in the high load region, the temperature within the cylinder can be lowered by taking advantage of the auxiliary chamber 20 in the low load region, too (by opening or closing the auxiliary chamber valve 21).

2. In the aforesaid examples, the target air-fuel ratio in the low load region may be set stepwise in accordance with the lean limits.

3. In the foregoing examples and variant, the auxiliary chamber 20 is arranged so as to be employed in the high load region. In the high load region, however, a strong swirl may be caused to occur in the combustion chamber 4 by taking advantage of the auxiliary chamber 20, as disclosed in Japanese Patent Laid-open Publication (kokai) No. 54-116,512. In this case, it is preferred that the timing of opening and closing the auxiliary chamber valve 21 can be made variable by taking advantage of the variable valve timing mechanism 34 and that the auxiliary chamber valve 21 is opened in the low load region immediately after the intake valve 8 has been closed.

4. The present invention can be applied to an internal combustion engine equipped with a supercharger, as indicated by reference numeral 51 in FIG. 3. For the engine with the supercharger, the temperature within the cylinder may be lowered with the auxiliary chamber 20 in the high load region in which the supercharger surpasses its charging capacity. This variant is effective as measures against knocking for an internal combustion engine with an extremely large magnitude of the charging pressure.

5. The present invention can likewise be applied to a diesel engine. This application is advantageous in terms of reducing Nox in exhaust gases. For the diesel engines, the timing of closing the auxiliary chamber valve 21 can be set nearby the timing of injecting fuel corresponding to the timing of ignition.

What is claimed is:

1. An internal combustion engine, comprising:
   an auxiliary chamber having an opening communicated to a combustion chamber of the internal combustion engine; and
   an auxiliary chamber valve for opening or closing the opening of said auxiliary chamber to the combustion chamber;
   wherein a timing of opening or closing said auxiliary chamber valve is set in such a manner that said auxiliary chamber valve is opened in a middle stage of a compression stroke and closed in a final stage of the compression stroke or in an initial stage of explosion stroke so as to cool a charge accepted by said auxiliary chamber.

2. An internal combustion engine as claimed in claim 1, wherein said engine is a 4-cycle engine of Otto type.

3. An internal combustion engine as claimed in claim 1, wherein said engine is a diesel engine.

4. An internal combustion engine as claimed in claim 1, wherein said engine is an engine of natural intake type.

5. An internal combustion engine as claimed in claim 1, wherein said engine is an engine of a type of charging intake air.

6. An internal combustion engine as claimed in claim 1, wherein said auxiliary chamber valve is adapted to be opened or closed at least at the time of high load.

7. An internal combustion engine as claimed in claim 1, wherein said auxiliary chamber valve is adapted to be opened or closed at the time of high load only and to be closed at the time of low load.

8. An internal combustion engine as claimed in claim 1, wherein said auxiliary chamber valve is adapted to be opened or closed in all load region.

9. An internal combustion engine as claimed in claim 1, wherein said auxiliary chamber valve is driven to be opened or closed with an engine output axle.

10. An internal combustion engine as claimed in claim 9, wherein said auxiliary chamber valve is driven to be opened or closed with the engine output axle through a cam shaft.

11. An internal combustion engine as claimed in claim 10, wherein a clutch is disposed in a passage for transmitting power between said engine output axle and said cam shaft.

12. An internal combustion engine as claimed in claim 11, wherein said clutch is coupled or decoupled in accordance with a running state of said engine.

13. An internal combustion engine as claimed in claim 1, wherein said auxiliary chamber valve is shifted between its operating state in which said auxiliary chamber valve is operated to be opened or closed and its rest state in which said auxiliary chamber valve is held in its closed state, in accordance with a running state of the engine.

14. An internal combustion engine as claimed in claim 1, wherein said auxiliary chamber is formed in a cylinder head of the engine.

15. An internal combustion engine as claimed in claim 1, wherein said auxiliary chamber is disposed through an outside casing mounted to a cylinder head of the engine.

16. An internal combustion engine as claimed in claim 15, wherein:
said auxiliary chamber formed in the outside casing is communicated with the combustion chamber through a connecting passage formed in the cylinder head; and
said auxiliary chamber valve is adapted to open or close an opening of said connecting passage communicated with the combustion chamber.

17. An internal combustion engine as claimed in claim 1, wherein a timing of closing said auxiliary chamber valve is in a final stage of a compression stroke.

18. An internal combustion engine as claimed in claim 1, wherein:
the engine is of a 4-cycle Otto type; and
an air-fuel ratio of a mixed fuel to be supplied to the combustion chamber is set to be leaner than a stoichiometric air-fuel ratio at the time of low load and the air-fuel ratio thereof is set to be richer in accordance with an increase in load at the time of high load.

19. An internal combustion engine as claimed in claim 18, wherein said auxiliary chamber valve is operated to be opened or closed in (all load) region other than the time of high load.

20. An internal combustion engine as claimed in claim 18, wherein said auxiliary chamber valve is operated to be opened or closed at least at the time of high load.

21. An internal combustion engine as claimed in claim 18, wherein said auxiliary chamber valve is operated to be opened or closed at the time of high load only and held in its closed state at the time of low load.

22. An internal combustion engine as claimed in claim 18, wherein the air-fuel ratio of the mixed fuel to be supplied to the combustion chamber is leaner than the stoichiometric air-fuel ratio at the time of high load when the load becomes higher than a predetermined magnitude of load.

23. An internal combustion engine as claimed in claim 18, wherein said auxiliary chamber valve is operated to be opened or closed only at the time of high load where a pressure of intake air becomes approximately atmospheric pressure or higher and said auxiliary chamber valve is held in its closed state when the pressure of intake air is outside said pressure.

24. An internal combustion engine as claimed in claim 18, wherein means for supplying fuel to the engine is a fuel injection valve.

25. An internal combustion engine as claimed in claim 18, wherein said air-fuel ratio is adapted so as to be continuously variable in accordance with a variation in load.

26. An internal combustion engine as claimed in claim 25, wherein said air-fuel ratio is set at the time of low load to become gradually leaner as the load increases and at the time of high load to become gradually richer as the load increases.

27. An internal combustion engine as claimed in claim 18, wherein the timing of closing said auxiliary chamber valve is in a final stage of a compression stroke.

28. An internal combustion engine as claimed in claim 27, wherein the timing of closing said auxiliary chamber valve is set to comply approximately with a timing of ignition.

* * * * *